United States Patent [19]
Kalmanash

[11] 3,906,333
[45] Sept. 16, 1975

[54] LOW COST SWITCHING HIGH VOLTAGE SUPPLY

[75] Inventor: Michael H. Kalmanash, Bethel, Conn.

[73] Assignee: United Aircraft Corporation, East Hartford, Conn.

[22] Filed: Sept. 30, 1974

[21] Appl. No.: 510,258

[52] U.S. Cl. ...................... 323/17; 307/18; 307/82; 315/411; 321/2; 323/45
[51] Int. Cl.² ........................................... G05F 1/26
[58] Field of Search .................... 307/17, 18, 31–34, 307/82, 83; 323/6, 7, 16, 17, 19, 45, DIG. 1; 321/2, 25; 315/379, 409, 410, 411

[56] References Cited
UNITED STATES PATENTS

| | | | |
|---|---|---|---|
| 2,630,557 | 3/1953 | Bixby | 323/45 X |
| 3,569,817 | 3/1971 | Boehringer | 321/2 |

*Primary Examiner*—A. D. Pellinen
*Attorney, Agent, or Firm*—M. P. Williams

[57] ABSTRACT

A switching high voltage supply of the type which includes the secondary of a high voltage step-up transformer in series with a DC high voltage power supply, such as for providing different high voltages to a cathode ray tube, includes a capacitor in series with the primary to establish DC voltages that result from random duty cycles and variable DC input levels, the capacitor voltage being fed to the regulation or control input of the DC high voltage supply, whereby DC voltages are coupled by the capacitor to the high voltage supply and AC voltages are coupled through the high voltage transformer. In a second embodiment, the transformer has two secondaries each in series with a high voltage supply controlled by the DC voltage of the capacitor, to provide related, switched high voltages, such as for the anode and the focus of a beam penetration cathode ray tube.

2 Claims, 3 Drawing Figures

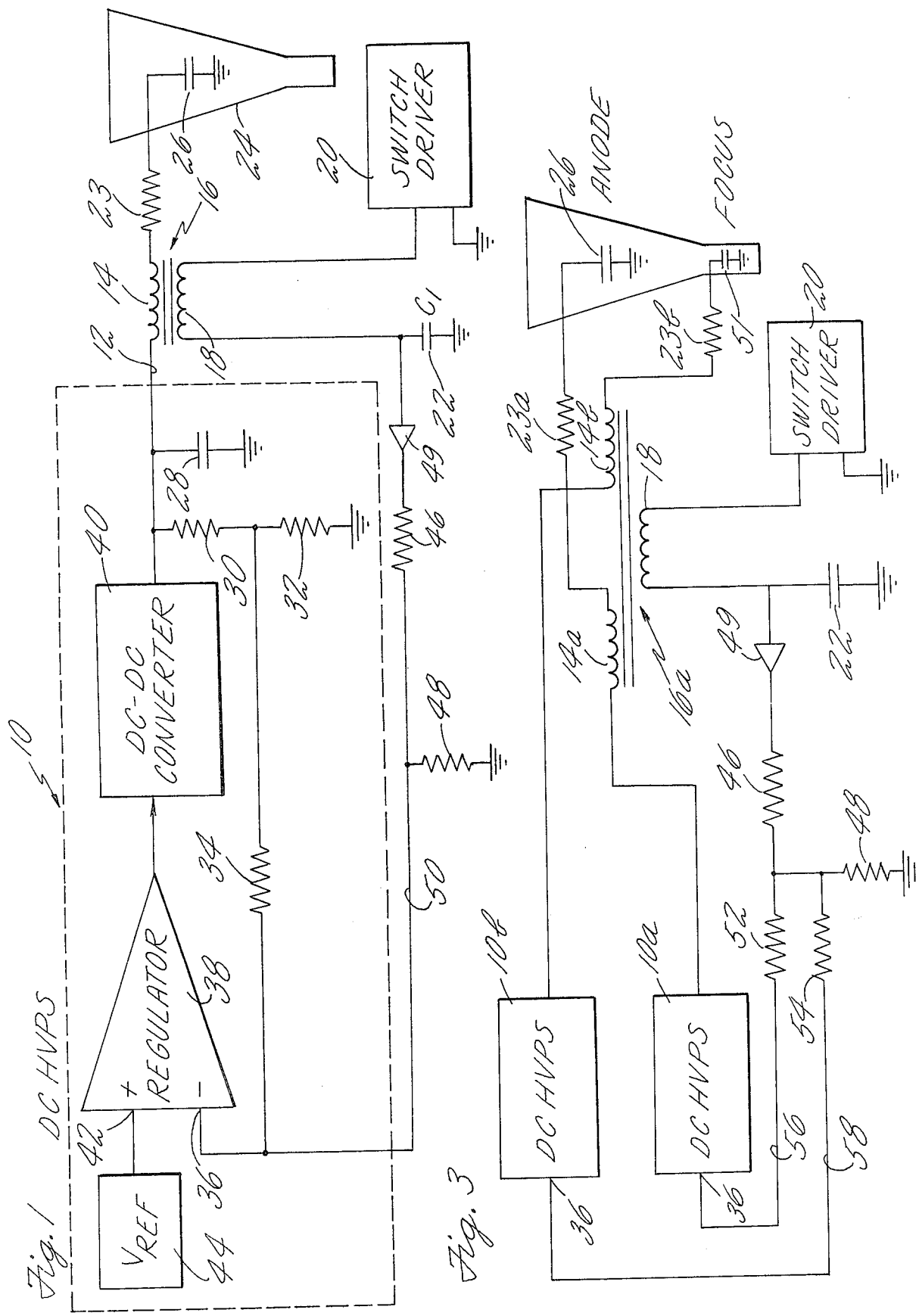

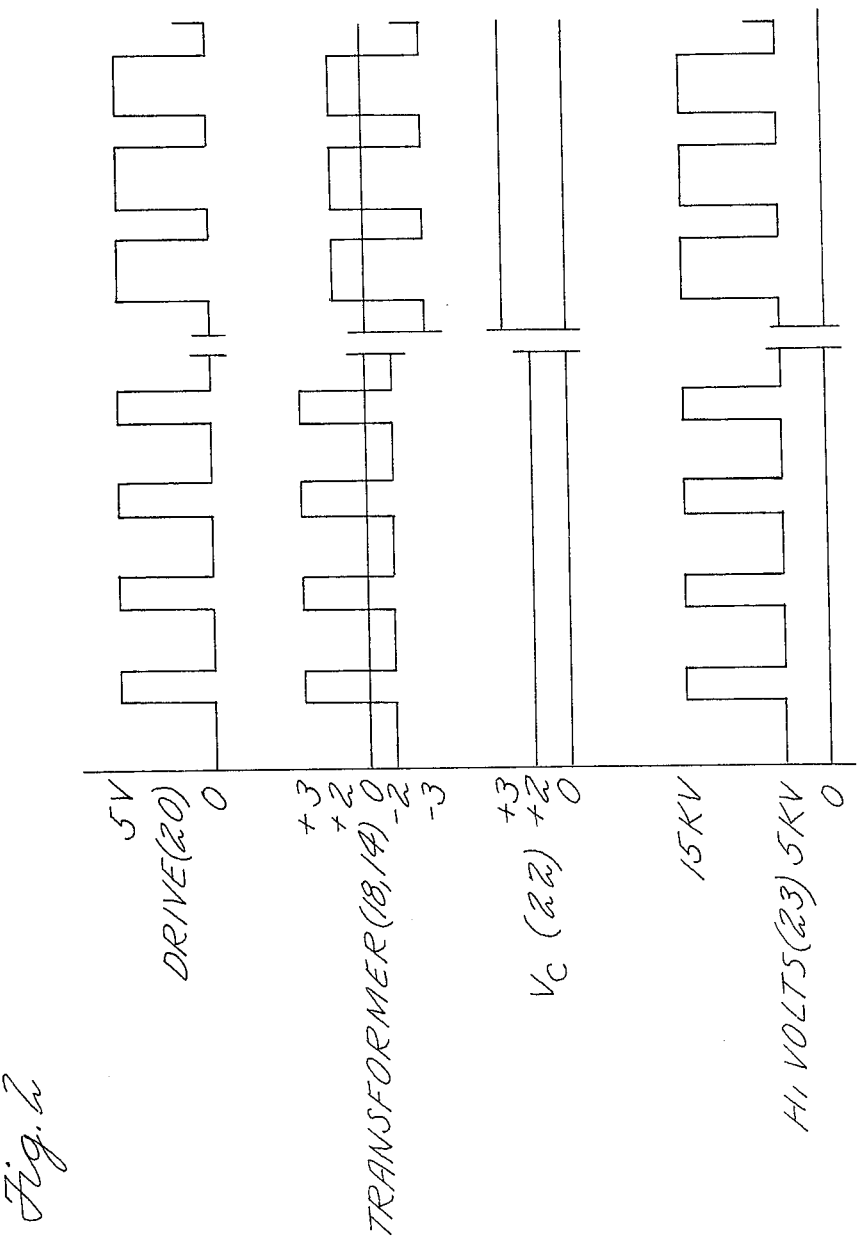

LOW COST SWITCHING HIGH VOLTAGE SUPPLY

BACKGROUND OF THE INVENTION

1. Field of Invention

This invention relates to high voltage power supplies, and more particularly to a low cost switching high voltage power supply capable of responding to DC level changes.

2. Description of the Prior Art

It is known to use a high voltage power supply in series with the secondary of a high voltage step-up transformer, so that signals supplied to the transformer primary will be reflected as high voltage additions or subtractions to the voltage of the high voltage supply. However, these systems are limited in usefulness to high voltage switching of balanced duty cycle (the duration of positive and negative swings being equal at all times), or, conceivably, to systems having a fixed duty cycle and a primary switching driver providing for zero DC level at the fixed duty cycle.

SUMMARY OF THE INVENTION

An object of the present invention is to provide a low cost, switching high voltage power supply capable of responding to DC level changes as well as AC level changes. Another object is to provide a switching type power supply capable of operating with a substantially random duty cycle.

According to the present invention, a high voltage power supply has the secondary of a high voltage step-up transformer in series therewith, the primary of the transformer being returned to ground through a capacitor for developing DC voltage levels, the voltage across the capacitor being fed to the regulation input of the DC high voltage supply. According further to the present invention, the transformer may have a pair of secondary windings, each in series with a DC high voltage supply, each supply being controlled by the DC voltage developed across the capacitor in series with the primary of the high voltage transformer.

The present invention utilizes the low cost aspects of a step-up transformer in series with a high voltage supply so as to provide high voltage DC switching, at random duty cycles, and with the ability to program DC level changes through the high voltage supply.

Other objects, features and advantages of the present invention will become more apparent from the following detailed description of preferred embodiments thereof, as illustrated in the accompanying drawing.

BRIEF DESCRIPTION OF THE DRAWING

FIG. 1 is a schematic block diagram of a preferred embodiment of the invention;

FIG. 2 is a diagram illustrating voltages in the embodiment of FIG. 1; and

FIG. 3 is a schematic block diagram of a dual supply modification of the embodiment of FIG. 1.

DESCRIPTION OF THE PREFERRED EMBODIMENTS

Referring now to FIG. 1, an illustrative embodiment of the present invention includes a typical high voltage power supply 10 of a known type, the output 12 of which is connected in series with the secondary 14 of a high voltage step-up transformer 16, the primary of which 18 is connected between a switch driver 20 and a capacitor 22 to ground. The secondary 14 may be connected through a damping resistor 23 wherever a switching high voltage is to be utilized, such as an anode of a CRT 24, represented in FIG. 1 as a large capacitor 26. The high voltage output on the line 12 is developed across a large filter capacitor 28, and a pair of resistors 30, 32 provide a voltage divider to develop a feedback voltage which is coupled by a resistor 34 to an inverting input 36 of a regulator, such as a differential amplifier 38 that controls the input to a DC to DC converter 40, thereby to control the voltage output of the converter on the line 12. The regulator has a second input 42 connected to a reference voltage source 44. In accordance with the invention, voltage across the capacitor 22 is inverted in an amplifier 49, divided by a pair of resistors 46, 48 connected as a voltage divider, and coupled by a line 50 to the input 36 of the regulator 38.

Referring to the left-hand half of FIG. 2, assume that the switch driver 20 impresses across the primary 18 the voltage shown at the top of FIG. 2. Since it is impossible for any DC voltage to be established across the primary 18, it is also impossible for any average DC level to be sustained across the primary 18. Therefore, the capacitor 22 develops a positive voltage which bucks or balances the average negative voltage which results from the transformer primary 18 operating about a zero average level. Since the secondary will also develop a voltage of the same waveform as in the primary, it will swing from a negative to a positive value if not corrected. In accordance with this invention, correction is provided by the voltage across the capacitor 22 being fed through the resistor 46 and the inverter 49 to the input 36 of the regulator 38, which causes a positive shift of an equivalent high voltage at the output of the converter. In other words, the gain from the input of the regulator 38 through to the DC output 12 of the converter, with respect to voltages across the capacitor 22, should be the same as the step-up turns ratio of the transformer 16. Thus, if the transformer 16 has a one to one thousand step-up ratio, a 5V change across the primary would result in a 5KV change across the secondary, but the uncorrected voltage swing in the secondary 14 would be −2KV to +3KV.

On the other hand, if the duty cycle changed, as shown in the right-hand half of FIG. 2, then there would be an even greater net positive voltage attempted to be impressed across the primary, causing the primary to swing from −3V to +2V, and the secondary to swing between −3KV and +2KV. In the embodiment of FIG. 1, this causes plus three volts to be developed across the capacitor. Assuming the DC to DC converter 40 has a nominal output of 10KV, if this voltage were not corrected, it is evident that the high voltage passed through the resistor 23 to the CRT 24 would swing from 8KV to 13KV (left side of FIG. 2) or swing from 7KV to 12KV (right side of FIG. 2), depending upon the duty cycle of the input. However by causing the voltage across the capacitor 22 to be fed to the regulator 38, the +2V or +3V, respectively, will be converted after double inversion by the inverter 49 and the regulator 38, to +2KV or +3KV to again cause the median voltage at the secondary 14 to be 10KV, so that the voltage swings from 5KV to 15KV.

An exemplary high voltage power supply 10 which may be utilized in the embodiment of FIG. 1 is sold under the trade designation Precision High Voltage CRT Power Supply, Model H-20 by Venus Scientific Inc., Farmingdale, N.Y. In such a supply, the resistors 30 and 32 may be in the ratio of 1000:1. The damping resistor 23 should provide at least critical damping, and perhaps over damping, in order to prevent oscillations over a variety of switching frequencies and duty cycles. Switching rates as low as 250 hertz, with as much as 7KV peak to peak voltage swings have been obtained using a Supermendor model AH65 core provided by Arnold Engineering Company, Marengo, Ill., with 172 turns of number 24AWA primary winding and 11,083 turns of number 38AWA secondary winding.

Subject to the ability of the DC to DC converter to decay in the negative direction (due to unipolar nature thereof which results from the rectifiers therein, as is well known), any suitable DC level may be coupled to the primary 18 and developed across the capacitor 22 for application to the regulator, in the manner described hereinbefore with respect to average DC levels resulting from variations in duty cycle. That is if the entire level of operation were desired to be moved from 10KV (the nominal output of the converter 40) to 12KV, a 2V DC level could be superposed upon any applied waveform which would result (in the example herein) in a 2KV increase in the nominal output of the converter 40.

A modification of the embodiment of FIG. 1 is illustrated in FIG. 3. Therein, a high voltage transformer 16a includes two secondaries 14a, 14b each in series with a corresponding power supply 10a, 10b and a related damping resistor 23a, 23b. The apparatus 10a, 14a, 23a may feed the anode 26 of a CRT, and the apparatus 10b, 14b, 23b may feed an electrostatic focus mechanism 51 of the CRT. Voltage developed across the capacitor 22 is inverted by amplifier 49 (which is alright since there is no current drain from the capacitor) and fed through the divider resistors 46, 48 and isolating resistors 52, 54 over lines 56, 58 to the respective inverting inputs 36 of the high voltage supplies 10a, 10b. The resistors 52, 54 isolate each of the regulators from the feedback of the other regulator (see FIG. 1). Each set of apparatus corresponding to the separate secondaries in FIG. 3 operates exactly as described with respect to FIG. 1 hereinbefore.

The high voltage portion of the apparatus of FIGS. 1 and 3 is essentially energy conservative, except for the small $I^2R$ losses across the damping resistors 23a, 23b. The greatest power losses are therefore in the switch driver 20, which may be configured in accordance with known technology so as to minimize these losses.

In order to minimize power dissipation losses in the high voltage power supply as a result of variations in the high voltage DC output in response to voltages developed across capacitor 22, it may be preferable that the high voltage power supply be of the type which uses switching voltage regulation in order to minimize losses. Otherwise, the invention may be utilized with any DC high voltage power supply having a control or regulation input, such as that provided by a feedback path which may be tapped onto as illustrated in FIG. 1.

Although the invention has been shown and described with respect to exemplary embodiments thereof, it should be understood by those skilled in the art that the foregoing and various other changes, omissions and additions thereto may be made therein, without departing from the spirit and the scope of the invention.

Having thus described typical embodiments of my invention, that which I claim as new and desire to secure by Letters Patent is:

1. A switching high voltage supply comprising:

a high voltage DC power supply having a control input;

a high voltage step-up transformer, said transformer having a primary winding and having a secondary winding connected in series between the output of said high voltage power supply and a load;

a capacitor connected in series with the primary of said transformer;

a switch driver for driving the series combination of said transformer primary and said capacitor; and means coupling DC voltages developed across said capacitor to the control input of said high voltage power supply.

2. A switching high voltage supply according to claim 1 wherein said transformer has a second secondary winding, and further comprising a second high voltage DC power supply having a control input, said second secondary winding connected in series between the output of said second power supply and a second load; and means coupling DC voltages developed across said capacitor to the control input of said second power supply.

* * * * *